United States Patent [19]
Mee

[11] 4,127,965
[45] Dec. 5, 1978

[54] METHOD FOR GROWING WOOD MUSHROOMS

[75] Inventor: Henry M. Mee, Castro Valley, Calif.

[73] Assignee: The Kinoko Company, Oakland, Calif.

[21] Appl. No.: 739,393

[22] Filed: Nov. 8, 1976

[51] Int. Cl.² ............................................. A01G 1/04
[52] U.S. Cl. ........................................... 47/1.1; 71/5; 71/63
[58] Field of Search ...................... 71/5, 23, 63, 64 A, 71/64 R, 64 G; 47/1.1

[56] References Cited

U.S. PATENT DOCUMENTS 2,005,365  6/1935  DiGiacinto .......................... 71/23 X

FOREIGN PATENT DOCUMENTS 1582809  3/1971  Fed. Rep. of Germany ............. 47/1.1
2151326  4/1973  Fed. Rep. of Germany ............. 47/1.1

OTHER PUBLICATIONS

Principles and Practice of Mushroom Culture, Stoller, from Econ. of Bot., vol. 8, #1, 3/1954, pp. 56–58.

*Primary Examiner*—Ferris H. Lander
*Attorney, Agent, or Firm*—Townsend and Townsend

[57] ABSTRACT

Method and kits are provided for the cultivation of Shiitake (*Lentinus edodes*) and similar forest mushrooms. A cultivation medium is introduced into a microorganism impermeable flexible container which is sealed against particulate matter, but allows the flow of air, the medium sterilized and then cooled. The bag is opened and inoculated with spawn, closed, and the spawn incubated at moderately elevated temperatures while being molded into a shaped form, conveniently a log or stump form, the container removed, and, as required, curing at moderate or moderately reduced temperatures carried out. Conditions are then changed to encourage growth of the mushrooms, followed by harvesting. A mushroom crop can be achieved in as few as about 40 days with continuous production for as long as about ten months.

21 Claims, No Drawings

METHOD FOR GROWING WOOD MUSHROOMS

BACKGROUND OF THE INVENTION

1. Field of the Invention

The cultivation of mushrooms has a venerable history. While mushrooms grow readily in the natural state, where they find a supportive environment, efforts to cultivate mushrooms require great care in order to obtain an economic crop. In producing cultivated mushrooms, a substrate must be provided which encourages the growth of the desired mushroom, while discouraging the invasion of undesirable bacteria and fungi. Mushrooms are particularly suspectible to variations in their environment and their growth can be substantially inhibited where the environment does not provide the necessary degree of moisture and aeration.

A mushroom which has long been cultivated in the Orient is the Shiitake mushroom. Its cultivation has depended on the use of logs which are inoculated with spawn and then allowed to grow. Normally, there is a long period, substantially exceeding one year before the first crop can be obtained. Great care must be taken in the growth of the Shiitake mushroom, usually employing a natural environment, so that the environment in which the Shiitake mushroom can be grown is limited.

Since the edible mushroom is an excellent source of food values, there is an increasing interest in enhancing the ability to grow mushrooms in an economical manner. Furthermore the mushroom is primarily grown on waste materials, and thus mushroom cultivation provides a method for turning waste materials into a human food. Finally, the substrate or compost employed after mushroom growth is exhausted, can be employed for mulching or composting crops.

In developing new techniques for growing mushrooms, it is desirable to use readily available inexpensive substrate materials. In addition, such cultivating techniques should provide as rapid a period as possible between the initial inoculation and the harvesting of a crop. Furthermore, it is desirable to maximize the number of crops obtained for each inoculated substrate. There is the additional consideration of the size, quality and yield of the mushrooms.

2. Description of the Prior Art

Texts of interest are Singer, *Mushrooms and Truffles, Interscience Publishers, Inc.,* New York (1961) and Gray, *The Use of Fungi as Food and in Food Processing,* CRC Press, Cleveland, Ohio (1970). U.S. Pats. of interest include U.S. Pat. Nos. 1,832,593; 1,833,089; 2,005,365; 2,677,917; 2,761,246; and 3,560,190. Foreign patents of interest include UK Patent No. 462,316; French Pat. No. 1,445,649 and Japanese Pat. Nos. 8756/64; 16050/70; 27768/70; 28527/70; 28532/70; 37047/70; 25682/71; 22768/72; 42660/72; and 3334/74;

SUMMARY OF THE INVENTION

Method and kits are provided for the growth of tree mushrooms, particularly mushrooms which do not require casing. A suitable substrate employing a cellulosic base and food supplements is introduced into a microscopic organism impermeable flexible container, which is sealed and sterilized. After cooling, the substrate is inoculated with the appropriate spawn, the container sealed against particulate matter but not against air and the substrate incubated at moderately elevated temperatures while being molded into a desired form e.g. log or stump, conveniently while still in the container, and is then removed from the container and cured, as required, at moderately reduced temperatures. After curing is completed, if employed, the conditions are changed to encourage the production of fruiting bodies which may then be harvested. Only a relatively short period of time is required between inoculation and harvesting and continued production can be obtained for as long as about ten months or more.

DESCRIPTION OF SPECIFIC EMBODIMENTS

The cultivation of tree mushrooms or other such mushrooms which do not require a casing is provided. The method involves initially growing mycelium under aseptic conditions, whereby the mycelium provide a structure within the substrate, so that the substrate can be molded into a desired form. After molding of the substrate, normal processing is employed involving curing, followed by fruiting. With mushrooms other than Shiitake, the curing step can be frequently eliminated.

A number of different tree mushrooms or mushrooms which do not require a casing can be prepared in accordance with the subject process. Various mushrooms include the Shiitake (*Lentinus edodes*), the oyster mushroom (*Pleurotus ostreatus*), the velvet stem (*Flammulina velutipes*), the wood ear mushroom (*Auricularia polytrica*) and the like. These mushrooms and others of the same family normally grow on logs and stumps in the forest. In prior cultivation, logs of a variety of trees have been employed, which have been inoculated with spawn of the desired mushroom.

The substrate which is employed for growth, is cellulosic based, which is supplemented with a number of nutrients. Water is also included in the mixture and, where necessary, various organic or inorganic additives may be included to provide for a friable aeratable condition.

The cellulosic material may be derived from any convenient source, such as sawdust, bagasse, hay, straw, paper chips (corrugated cardboard), cotton and the like. That is, the cellulosic material is derived from naturally occurring plant (including trees) sources, normally without chemical modification. The cellulosic material is finely comminuted, with particles generally having dimensions less than about one-half inch, more usually less than about one-quarter inch, but usually greater than about 100 U.S. mesh, preferably being from about one to five mm (medium coarse). Shavings, chips, powder, chopped straw and the like may be used. The cellulosic material will normally provide at least 50 and more usually at least 60 percent of the dry weight and generally less than about 95, more usually less than about 85 percent of the dry weight.

A wide variety of nutrient supplements may be employed in finely comminuted form, such as grains, starches, yeast, sugars or the equivalent, naturally occurring or synthetic proteins, and the like. The nutrients are conventional and are amply illustrated in the references cited previously. See also Block et al, *Experiments and the Cultivation of P. Ostreatus,* the proceedings of the Fourth International Conference on Scientific Aspects of Mushroom Growing, 18th-26th July, 1959, German OLS 2,012,423 and Block et al J. Agri. and Food Chemistry 6, 923 (1958).

A wide variety of sources of starch may be used, having a major amount of starch such as rice, potato, corn, tapioca, sago, waxy maize, wheat, sorghum, and arrowroot, particularly rice and potato. The starches will normally provide from about 5 to 20, more usually from about 7 to 15 weight percent of the dry weight. Frequently, included with the naturally occurring starch material will be various amounts of plant protein.

As a source of protein, a wide variety of naturally occurring materials can be employed, such as grains, e.g. milo, yeast, soya meal, sorghum and the like. In some instances, the same material may provide both starches and proteins. Normally, the proteinaceous natural product will be from about 1 to 15 percent, more usually from about 1 to 10 weight percent.

The combination of starch and protein source materials will generally be at least about 5 percent and not more than about 40 percent of the dry weight of the composition, more usually at least about 8 percent and not more than about 25 percent of the dry weight of the composition.

In addition, a small amount, usually up to 10, more usually 1 to 8 weight percent of a sugar source will be included, normally being a mono-, di- or trisaccharide or combinations thereof or equivalents thereto. Illustrative saccharides include sucrose, fructose, glucose, molasses, for the purposes of this invention, glycerol, and the like. The saccharides provide for rapid start-up but are not essential for growth.

Other additives may also be included as appropriate to fulfill specific functions. Small amounts of trace elements may be desirable in certain instances. The addition of small amounts of ammonium salts may be of advantage. Generally, these additives will be in the range of about 0.1 to 0.5 weight percent based on the dry weight of the composition. Desirably, conventional additives may be added to improve permeability of the mixture to provide a crumbly mass, so as to enhance aeration. Conveniently, calcium sulfate may be employed. The amount of additive to enhance permeability will generally range from about 0.5 to 20 weight percent.

The amount of water will generally be at least one part by weight per part of the dry mixture and not more than about two parts, more usually not more than about 1.5 parts.

After sterilization, the pH of the mixture should be on the acid side, being below seven, generally in the range of 4.5 to below seven, more usually in the range of about 4.5 to below about 6.8.

Typically, by analysis, the dry materials of the growth medium will have about 5 to 10 weight percent water, 2 to 5 weight percent protein, 0.1 to 1 weight percent fat, 35 to 60, more usually 40 to 50 weight percent fiber, 2 to 20, more usually about 5 to 15 weight percent ash and about 25 to 45, more usually about 30 to 40 weight percent available carbohydrate.

For the Shiitake mushroom, a particularly desirable composition has for about 70 to 85, more usually from about 75 to 85 weight percent of sawdust. The sawdust may come from a variety of trees, particularly useful trees being hardwoods such as oaks, Shiis, chestnut or the like, although the sawdust need not be limited to these trees and may be derived from any tree source. Normally, not more than 40 weight percent of softwood (coniferous) will be employed. The starch will generally be at least about five percent and not more than about 15 percent of the composition by weight. The protein source is conveniently yeast which is present in from about one to five weight percent. Normally, a small amount of an additive is provided to insure permeability of the mixture, generally from about two to eight weight percent, more usually from about three to six weight percent. The additive is conveniently calcium sulfate. The water added to the mixture will generally be from about 1 to 1.5 parts by weight per part of dry mixture. The pH after sterilization is preferably in the range of about 4.5 to 5.5.

After mixing the various ingredients to insure substantial homogeneity, an inert sealable container, normally flexible, is substantially filled with the mixture. Conveniently, inert plastic bags may be employed, particularly of high density polyethylene or polypropylene. The thickness of the bag wall should be sufficient to provide the necessary mechanical strength for the subsequent processing and have a high enough melting point, so as to retain its structure during sterilization. Usually, a thickness of about one to five mils will suffice. The bags should be of a convenient size to allow for subsequent molding of the culture medium, when the medium is formed in the bag. Convenient size bags are 6 × 18 inches and 4 × 15 inches.

After the cultivation substrate is introduced into the bag, the bag is sealed by any convenient means to prevent the introduction of particulate matter, but allow for the passage of air. Filters e.g. micropore filters, cotton plugs, arcuate path tubing or the like may be employed. During sterilization any method of sealing may be employed, but it is usually convenient to use the same method of sealing during sterilization and incubation. The bag is then sterilized, conveniently in an autoclave, at superheated steam temperatures, normally about 120° C. for 60 minutes. The time and temperature should be chosen to insure the aseptic character of the substrate to prevent the growth of other microorganisms during the mycelial growth.

After allowing the bag to cool to substantially ambient or ambient temperatures, the bag is opened and inoculated with spawn. Any appropriate spawn for the specific mushroom may be employed and a sufficient amount of the spawn is inoculated, so as to insure substantially uniform growth of the mycelium during the incubation period. Generally, the amount of spawn will be from about 1 to 10 wet weight percent based on the total weight (including water) of the substrate. The inoculated substrate in the bag is then incubated at moderate temperatures, generally from about 20° to 28° C., preferably from about 24° to 27° C. for about six to twelve, more usually seven to ten days.

During the growth and reproduction of the mycelium from the spawn in the substrate, the substrate is formed into any desired shape. Depending upon the particular mushroom which is being grown, one or more different shapes may be employed to advantage. With the Shiitake mushroom, it is desirable to have a log shape, so as to maximize the surface area on which the mushrooms may grow. Logs can conveniently be of about three inches diameter and eleven inches in length. The substrate may be removed from the bag during the molding operation, but is preferably molded in the bag under aseptic conditions. The bag may be introduced into a form or die and formed. Normally, one to two days of incubation, preferably two days will be sufficient to provide a stable structure, although longer periods may be employed if desired. Sufficient time should be permitted to allow the mycelial growth to permeate substantially all or all of the substrate.

While logs are convenient for Shiitake mushrooms, they may also be used for the other mushrooms. In addition to log or cylinder shaped forms, stump shaped, plate shaped or the like may be employed. The particular form which is made will depend upon the end use of the form e.g. whether commercial or home production, the mushroom involved, convenience of packaging and shipping, and the like.

If the Shiitake mushroom is involved, the molded form will now be cured. Curing involves employing a moderately reduced temperature to encourage reproductive growth. Proper air circulation should be provided and the temperature will generally range from about 5° to below 18° C., more usually from about 10° to 15° C. Logs can be conveniently supported at an angle, so that air can circulate the entire length of the log. The curing will generally take from about 10 to 20 days.

The next stage is for the production of fruiting bodies and may be performed immediately after curing or the log maintained in a dormant stage and sold to allow for fruiting and cropping by the purchaser. Where no curing is required, the molded product may be maintained in a dormant stage until sold. Storage at ambient temperatures should generally be less than about eight months, more usually less than about six months, while storage at about 0° to 10° C. may be as long as three years. With those mushrooms which do not require curing, the molded form may be retained in the bag until the growth of fruiting bodies is desired.

When growth is desired, the molded form will then be maintained at about 10° to 25° C., preferably 10° to 20° C., normally at a temperature above the temperature employed for curing. Relative humidity should be about 80 to 95 percent. Normally, fruiting will occur within 10 to 20 days and the crop collected, so as to allow for the next growth.

In order to demonstrate the subject invention, the following substrate formulations were prepared.

| Formulation I | |
|---|---|
| | g |
| sawdust | 400 |
| potato starch | 40 |
| yeast powder | 10 |
| $CaSO_4 \cdot 2H_2O$ | 20 |
| water | 600 |
| pH 4.8 after sterilization | |
| II | |
| bagasse | 200 |
| rice | 40 |
| milo | 40 |
| sucrose | 5 |
| water | 400 |
| pH 4.9 after sterilization | |
| III | |
| paper chips (corrugated container) | 500 |
| milo | 50 |
| rice | 50 |
| yeast | 20 |
| bonemeal | 20 |
| sucrose | 10 |
| water | 750 |

The above formulation I was employed for Shiitake mushrooms and an excellent and rapid growth was achieved by following the process described above. The logs which were formed were eight to twelve inches long and three to four inches in diameter and up to about eight crops could be obtained over a period of about ten months. Formulations II and III were employed with velvet stem, tree oyster and wood ear mushrooms and rapid and efficient growth was obtained in each instance.

The subject invention provides a convenient, economical and efficient way for cultivating mushrooms either commercially or in the home. With the Shiitake mushroom, the need to employ tree logs in the forest is avoided and much more rapid fruit body formation is achieved from the time of inoculation. Furthermore, the formed product can be readily stored and shipped, so as to allow for home cultivation. The subject method allows for controlled aspectic inoculation, followed by mycelial growth to prevent the invasion of undesirable microorganisms. Thus, there is substantial assurance that the mushrooms which do grow are the mushrooms derived from the initial inoculation. Also, a product can be molded in a permanent convenient shape to give a plurality of harvests.

The subject process allows growth of Shiitake mushrooms in a relatively low labor intensive manner avoiding the tedious processes employed presently in Japan for the growth of Shiitake mushrooms. Furthermore, the forest environment which is normally employed before the first crop is obtained is obviated. In addition, year-round production is achieved, since one is not dependent upon naturally occurring conditions to provide the desired environment for growth.

Although the foregoing invention has been described in some detail by way of illustration and example for purposes of clarity of understanding, it will be obvious that certain changes and modifications may be practiced within the scope of the appended claims.

What is claimed is:

1. A method for preparing an article useful for the growth of tree mushrooms which comprises:
    preparing a tree mushroom substrate by mixing water in from about one to two parts by weight per part of a dry mixture having a major portion of the particles of a naturally derived cellulosic material and minor portions of starch and protein sources to form a permeable mass;
    introducing said substrate into a flexible container, sealing said container and sterilizing said substrate;
    while in said container, inoculating said substrate with tree mushroom spawn and incubating said inoculated substrate under substantially aseptic conditions, at least initially while in a form for a time sufficient to allow substantial permeation of the mycelial from said spawn throughout said substrate to provide a formed article; and
    removing said container from said form to provide a formed article capable of producing fruiting bodies.

2. A method according to claim 1, wherein said tree mushroom is Lentinus edodes.

3. An article prepared according to the method of claim 2.

4. A method according to claim 1, including the additional steps of maintaining said formed article at a temperature in the range of about 10° to 25° C. and at a relative humidity of about 80 to 95 percent for a time sufficient for the production of fruiting bodies.

5. A method according to claim 1, wherein said mushroom is said Lentinus edodes and including the additional steps of:
    curing said article at a temperature in the range of about 5° to below about 25° C. for from about 10 to 20 days; and
    maintaining said cured article at a temperature of from about 10° to 25° C. and a relative humidity of from about 80 to 95 percent for a time sufficient for the formation of fruiting bodies.

6. A method according to claim 1, wherein said mushroom is pleurotus.

7. An article prepared according to the method of claim 6.

8. A method according to claim 1, wherein said mushroom is Flammulina velutipes.

9. An article prepared according to the method of claim 8.

10. A method according to claim 1, wherein said mushroom is Auricularia polytrica.

11. An article prepared according to the method of claim 10.

12. An article prepared according to the method of claim 1.

13. A method for preparing an article useful for the growing of tree mushrooms other than L. edodes which comprises:
  forming a tree mushroom substrate by mixing from about 1 to 1.5 parts by weight of water with about one part of a dry mixture of from about 50 to 95 weight percent of a naturally derived cellulosic material, from about 5 to 40 weight percent from starch and protein source materials and up to about 10 weight percent of a sugar source;
  introducing said substrate into a flexible container, sealing said container from particulate matter and sterilizing said substrate;
  while in said container, inoculating said substrate with spawn and
  incubating said substrate under aseptic conditions at a temperature of from about 24° to 28° C. for from about 7 to 10 days, wherein at least initially for one day said substrate is maintained in a form to obtain a stable formed article by substantial permeation of the mycelial from said spawn throughout said substrate; and
  removing said container from said form to provide a formed article capable of providing fruiting bodies.

14. A method according to claim 13, including the additional step of maintaining said formed article at a temperature in the range of about 10° to 25° C. at a relative humidity of about 80 to 95 percent for a period of from about 10 to 20 days to provide for the growth of fruiting bodies.

15. An article prepared according to the method of claim 13.

16. A method for producing an article useful for the growing of L. edodes which comprises:
  forming a L. edodes substrate by mixing from about 1 to 1.5 parts by weight of water with a dry mixture comprising from about 70 to 85 weight percent of sawdust having at least 60 weight percent derived from hardwood, from about 5 to 15 weight percent of a naturally derived starch source, from about 1 to 5 weight percent of a naturally derived protein source, and from about 2 to about 8 weight percent of a permeability additive to provide a crumbly mass;
  introducing said substrate into a flexible container, sealing said container from particulate matter and sterilizing said substrate;
  while in said container, inoculating said substrate with $L.$ $edodes$ spawn and incubating said substrate under aseptic conditions while allowing for contact with air at a temperature in the range of about 24 to 28° C. for a time of from about six to twelve days, at least initially for at least one day maintaining said substrate in a form, whereby the mycelial growth of said spawn permeates substantially all of said substrate to provide a stable formed article; and
  removing said form to produce a formed article capable of producing fruiting bodies.

17. A method according to claim 16, including the additional step of curing said formed article at a temperature of from about 5° to 18° C. for a period of from about 10 to 20 days; and
  maintaining said cured article at a temperature of from about 10° to 25° C., and at a relative humidity of from about 80 to 95 percent for a period of 10 to 20 days to produce fruiting bodies.

18. A method according to claim 16, wherein said form is in the shape of a cylinder.

19. An article prepared according to the method of claim 18.

20. A method according to claim 16, wherein said permeability additive is calcium sulfate.

21. An article prepared according to the method of claim 16.

* * * * *